United States Patent
Sathyanarayana et al.

(10) Patent No.: US 8,468,167 B2
(45) Date of Patent: Jun. 18, 2013

(54) AUTOMATIC DATA VALIDATION AND CORRECTION

(75) Inventors: Vinaya Sathyanarayana, Bangalore (IN); Salaka Sivananda, Karnataka (IN); Peeta Basa Pati, Karnataka (IN)

(73) Assignee: CoreLogic, Inc., Santa Ana, CA (US)

( * ) Notice: Subject to any disclaimer, the term of this patent is extended or adjusted under 35 U.S.C. 154(b) by 381 days.

(21) Appl. No.: 12/967,471

(22) Filed: Dec. 14, 2010

(65) Prior Publication Data

US 2012/0102002 A1   Apr. 26, 2012

(51) Int. Cl.
  *G06F 7/00*  (2006.01)
  *G06F 17/00* (2006.01)
  *G06F 17/30* (2006.01)

(52) U.S. Cl.
  USPC .............................. 707/776; 707/690; 707/749

(58) Field of Classification Search
  None
  See application file for complete search history.

(56) References Cited

U.S. PATENT DOCUMENTS 7,797,635 B1 *   9/2010   Denise .......................... 715/738
2008/0004893 A1 *   1/2008   Graboske ........................ 705/1

* cited by examiner

*Primary Examiner* — Pierre Vital
*Assistant Examiner* — Berhanu Mitiku
(74) *Attorney, Agent, or Firm* — Chapin IP Law, LLC

(57) ABSTRACT

Techniques disclosed herein include systems and methods for data validation and correction. Such systems and methods can reduce costs, improve productivity, improve scalability, improve data quality, improve accuracy, and enhance data security. A data manager can execute such data validation and correction. The data manager identifies one or more anomalies from a given data set using both contextual information and validation rules, and then automatically corrects any identified anomalies or missing information. Identification of anomalies includes generating similar data elements, and correlating against contextual information and validation rules.

32 Claims, 16 Drawing Sheets

300

| 305 | 306 | 307 | 308 |
|---|---|---|---|
| Anomalous Names Data | Similar Names Generation | Results from Comparison with Reference Data Source | Destination List |
| Cesar Octavio | Cesar Octavio | Found | Matched |
| | Desar Octavio | Not Found | Non-matched |
| | Cesap Octavio | Not Found | Non-matched |
| | Cesar Dctavio | Not Found | Non-matched |
| | Cesar Octano | Not Found | Non-matched |
| | Cesar Octavlo | Not Found | Non-matched |
| | Ceasar Octavio | Not Found | Non-matched |
| | Caesar Octavio | Not Found | Non-matched |
| | Cedar Octavio | Not Found | Non-matched |
| | Cesar | Found | Matched |
| | Octavio | Found | Matched |
| John Nelson | John | Found | Matched |
| | Nelson | Found | Matched |
| | John Nelson | Found | Matched |
| | Kohn Nelson | Found | Matched |
| | Jolm Nelson | Not Found | Non-matched |
| | Jolen Nelson | Found | Matched |
| | John Neison | Found | Matched |
| | John Nejson | Not Found | Non-matched |
| | John Belson | Found | Matched |
| | John Melson | Found | Matched |
| | John Melkon | Found | Matched |
| | John Nelkon | Not Found | Non-matched |
| | John Nelsom | Found | Matched |
| | John Nelbon | Found | Matched |
| | John Nelsob | Not Found | Non-matched |

*FIG. 3*

| 505 | 510 | 515 | Parsed & Standardized Address | | | | | |
|---|---|---|---|---|---|---|---|---|
| | | | 521 | 522 | 523 | 524 | 525 | 526 |
| Input Address | Adequacy Test Outcome | Search Outcome | UNIT | DIRECTION | STREET | CITY | STATE | ZIP+4 |
| 103 IMPERIAL HWY BREA CA | PASS | 103 W IMPERIAL HWY BREA CA 92821-7903 | 103 | W | IMPERIAL HIGHWAY | BREA | CA | 92821-7903 |
| | | 103 W IMPERIAL HWY STE BREA CA 92821-7903 | 103 | W | IMPERIAL HIGHWAY STREET | BREA | CA | 92821-7903 |
| 15047 PEPPER CRT CA | FAIL | | | | | | | |
| 15047 PEPPER CT CA 92551 | PASS | 15047 PEPPER CT MORENO VALLEY CA 92551-3623 | 15047 | | PEPPER COURT | MORENO VALLEY | CA | 92551-3623 |
| 339 W CORRIENTE CT QUEEN CREEK AZ 85242 | PASS | 339 W CORRIENTE CT QUEEN CREEK AZ 85143-4867 | 339 | W | CORRIENTE COURT | QUEEN CREEK | AZ | 85143-4867 |
| 339 W CORRIENTE CT 85242 | PASS | 339 W CORRIENTE CT QUEEN CREEK AZ 85143-4867 | 339 | W | CORRIENTE COURT | QUEEN CREEK | AZ | 85143-4867 |
| 339 CORRIENTE CT 85242 | PASS | 339 W CORRIENTE CT QUEEN CREEK AZ 85143-4867 | 339 | W | CORRIENTE COURT | QUEEN CREEK | AZ | 85143-4867 |
| 340 W 85242 | FAIL | | | | | | | |

*FIG. 5*

| 705 Input Data | 710 Adequacy Test Result | 715 Search Results | PROPERTY DATA | |
|---|---|---|---|---|
| | | | 721 APN | 722 LEGAL INFO |
| PARCEL 2 AT CIRCLE CROSS RANCH LOT 106 PINAL CNTY AZ | PASS | Single Record Match | 210-68-23202 | PARCEL 2 AT CIRCLE CROSS RANCH LOT 106 SEC 6-3S-8E 5047 SQ FT 0.12 AC |
| APN: 210-68-232, PINAL COUNTY, AZ | PASS | Single Record Match | 210-68-23202 | PARCEL 2 AT CIRCLE CROSS RANCH LOT 106 SEC 6-3S-8E 5047 SQ FT 0.12 AC |
| CABINET:D, SLIDE 86, PINAL COUNTY, AZ | PASS | Multiple Record Match | 210-68-23301 | PARCEL 2 AT CIRCLE CROSS RANCH LOT 106 SEC 6-3S-8E 5047 SQ FT 0.12 AC |
| | | | 210-68-23400 | PARCEL 2 AT CIRCLE CROSS RANCH LOT 107 SEC 6-3S-8E 5047 SQ FT 0.12 AC |
| | | | 210-68-23806 | PARCEL 2 AT CIRCLE CROSS RANCH LOT 108 SEC 6-3S-8E 5047 SQ FT 0.12 AC |
| | | | 210-68-24200 | PARCEL 2 AT CIRCLE CROSS RANCH LOT 112 SEC 6-3S-8E 5047 SQ FT 0.12 AC |
| | | | 210-68-24606 | PARCEL 2 AT CIRCLE CROSS RANCH LOT 116 SEC 6-3S-8E 5047 SQ FT 0.12 AC |
| | | | | PARCEL 2 AT CIRCLE CROSS RANCH LOT 120 SEC 6-3S-8E 5616 SQ FT 0.13 AC |
| LOT 106 of PINAL COUNTY | FAIL | No Match | | |

*FIG. 7*

| 905 Input | 910 Input Data Type | 915 Supporting Info / Context | Search Outcome ||| 940 Weight Assigned |
|---|---|---|---|---|---|---|
| | | | 921 Returns | 922 NAME | 923 ADDRESS | |
| John Nelson | NAME | STATE=AZ | Multiple Records Match | JOHN NELSON | 1000 E PINON ST QUEEN CREEK, AZ | 50 |
| | | STATE=AZ | | JOHN P NELSON | 339 W CORRIENTE CT QUEEN CREEK, AZ 85143 | 100 |
| | | STATE=AZ | | JOHN P NELSON | 339 W CORRIENTE CT QUEEN CREEK, AZ 85243 | 75 |
| | | STATE=AZ | | JOHN P NELSON | 113 W HAYDEN PARK RD QUEEN CREEK, AZ 85243 | 50 |
| | | STATE=AZ | | JOHN R NELSON | 113 W HAYDEN PARK RD QUEEN CREEK, AZ | 50 |
| Kohn Nelson | NAME | STATE=AZ | No Match | **** | **** | 0 |
| Jolen Nelson | NAME | STATE=AZ | Single Record Match | JOLENE M NELSON | 30972 N BRAMWELL AVE QUEEN CREEK AZ 85143-3379 | 50 |
| John Nelson | NAME | STATE=AZ | No Match | **** | | 0 |
| John Belson | NAME | STATE=AZ | Single Record Match | JOHN J BELSON | 6451 N Lena Pl Tucson, AZ 85741 | 50 |
| John Melson | NAME | STATE=AZ | No Match | **** | **** | 0 |
| John Melkon | NAME | STATE=AZ | No Match | **** | **** | 0 |
| John Nelsom | NAME | STATE=AZ | No Match | **** | **** | 0 |
| John Nelbon | NAME | STATE=AZ | No Match | **** | **** | 0 |
| 339 W CORRIENTE CT QUEEN AZ 85143-4867 | ADDRESS | | Single Record Match | JOHN P NELSON | 339 W CORRIENTE CT QUEEN CREEK AZ 85143-4867 | 100 |

| 1005 | 1010 | SEARCH OUTCOME 1040 | | | |
|---|---|---|---|---|---|
| INPUT APN | INPUT ADDRESS | 1021 Returns | 1022 APN | 1023 ADDRESS | WEIGHT |
| APN: 210-68-232 PINAL COUNTY AZ | **** | Single Record | 210-68-23202 | 339 W. CORRIENTE CT QUEEN CREEK AZ 85243 | 100 |
| **** | 339 W. CORRIENTE CT QUEEN CREEK AZ | Single Record | 210-68-23202 | 339 W. CORRIENTE CT QUEEN CREEK AZ 85243 | 100 |
| APN: 210-68-233 PINAL COUNTY AZ | **** | Single Record | 210-68-23301 | 351 W. CORRIENTE CT QUEEN CREEK AZ 85243 | 50 |

| 1105 | 1110 | SEARCH OUTCOME 1140 | | |
|---|---|---|---|---|
| INPUT APN | INPUT NAME | 1121 Returns | 1122 APN | 1123 OWNER NAME | WEIGHT |
| APN: 210-68-232 PINAL COUNTY, AZ | **** | Single Record | 210-68-23202 | JOHN P NELSON | 100 |
| **** | JOHN NELSON | Mutliple Record | 210-68-23202 | JOHN P NELSON | 100 |
| | | | 103-38-23608 | JOHN P NELSON | 50 |
| | | | 210-70-49302 | JOHN R NELSON | 50 |
| | | | 407-11-44705 | JOHN V NELSON | 50 |
| | | | 505-80-12708 | JOHN E NELSON TRS | 50 |

| | INPUT | | | | | Search and Standardization | | | |
|---|---|---|---|---|---|---|---|---|---|
| 1305 | 1310 | 1315 | 1341 | 1342 | 1343 | 1321 | 1322 | 1323 | 1347 |
| NAME | ADDRESS | PROP. APN | WT. 1 | WT. 2 | WT. 3 | NAME | ADDRESS | PROP. APN | WEIGHT |
| JOHN NELSON | 1000 E PINON ST QUEEN CREEK AZ | | 50 | 0 | 0 | JOHN NELSON | 1000 E PINON ST QUEEN CREEK AZ 85240 | 104-24-02808 | 6 |
| JOHN P NELSON | 339 W. CORRIENTE CT QUEEN CREEK AZ 85143 | | 100 | 0 | 0 | JOHN P NELSON | 339 W CORRIENTE CT QUEEN CREEK AZ 85143-4867 | 210-68-23202 | 41 |
| JOHN P NELSON | 339 W. CORRIENTE CT QUEEN CREEK AZ 85243 | | 75 | 0 | 0 | JOHN P NELSON | 339 W CORRIENTE CT QUEEN CREEK AZ 85143-4867 | 210-68-23202 | 41 |
| JOHN P NELSON | 113 W HAYDEN PARK RD QUEEN CREEK AZ 85243 | | 50 | 0 | 0 | JOHN R NELSON | 113 W HAYDEN PARK RD QUEEN CREEK AZ | 210-70-49302 | 18 |
| JOHN R NELSON | 113 W HAYDEN PARK RD QUEEN CREEK AZ | | 50 | 0 | 0 | JOHN R NELSON | 113 W HAYDEN PARK RD QUEEN CREEK AZ | 210-70-49302 | 18 |
| JOLENE M NELSON | 30972 N BRAMWELL AVE QUEEN CREEK AZ 85143-3379 | | 50 | 0 | 0 | JOLENE M NELSON | 30972 N BRAMWELL AVE QUEEN CREEK AZ 85143-3379 | 210-77-33103 | 6 |
| JOHN P NELSON | 339 W. CORRIENTE CT QUEEN CREEK AZ 85143-4867 | | 100 | 0 | 0 | JOHN P NELSON | 339 W CORRIENTE CT QUEEN CREEK AZ 85143-4867 | 210-68-23202 | 41 |
| | 339 W. CORRIENTE CT QUEEN CREEK AZ 85243 | 210-68-23202 | 0 | 100 | 0 | JOHN P NELSON | 339 W CORRIENTE CT QUEEN CREEK AZ 85143-4867 | 210-68-23202 | 41 |
| | 339 W. CORRIENTE CT QUEEN CREEK AZ 85243 | 210-68-23202 | 0 | 100 | 0 | JOHN P NELSON | 339 W CORRIENTE CT QUEEN CREEK AZ 85143-4867 | 210-68-23202 | 41 |
| | 351 W. CORRIENTE CT QUEEN CREEK AZ 85243 | 210-68-23301 | 0 | 50 | 0 | LAVORA TA GUIDO A | 351 W. CORRIENTE CT QUEEN CREEK AZ 85243 | 210-68-23301 | 6 |
| JOHN P NELSON | | 210-68-23202 | 0 | 0 | 100 | JOHN P NELSON | 339 W CORRIENTE CT QUEEN CREEK AZ 85143-4867 | 210-68-23202 | 41 |
| JOHN P NELSON | | 103-38-23608 | 0 | 0 | 50 | JOHN P NELSON | 2267 E 35TH AVE APACHE JUNCTION AZ 85219 | 103-38-23608 | 6 |
| JOHN R NELSON | | 210-70-49302 | 0 | 0 | 50 | JOHN R NELSON | 113 W. HAYDEN PARK QUEEN CREEK AZ 85243 | 210-70-49302 | 18 |
| JOHN E NELSON TRS | | 505-80-12708 | 0 | 0 | 50 | JOHN NELSON E TRS | 1763 E SYCAMORE RD CASA GRANDE AZ 85222 | 505-80-12708 | 6 |

FIG. 13

AUTOMATIC DATA VALIDATION AND CORRECTION

CROSS REFERENCE TO RELATED APPLICATIONS

The present application claims the benefit of Indian Patent Application No. 3165/CHE/2010, filed on Oct. 25, 2010, entitled "Automatic Data Validation And Correction," which is incorporated herein by reference in its entirety.

BACKGROUND

The present disclosure relates to data validation and correction of electronic data. Data, in general, is being acquired at increasing rates. There are many businesses, governments, and other organizations that extract or collect data from various documents and from any number of sources. For example, data can be extracted from paper and electronic documents, interviews, transcribed audio, queries, web publications, etc. This extracted data is commonly organized in one or more databases for subsequent reference and use for any number of industries and applications. Such extracted/collected data can include potential inconsistencies, inaccuracies, missing information, and many other types of errors and anomalies. Data validation processes are used to ensure that such anomalies are identified and corrected before data is used for additional processing and applications.

SUMMARY

Data validation involves processes and systems for verifying that data is correct. There are several different types of potential anomalies within any given set of data. One type of anomaly is that of incorrect formatting. For example, a given form has a specific field for entering a U.S. zip code in a five-digit format, but a zip code was entered in this specific field using a five+four digit format instead of the requested five-digit format. In another example, a particular individual's full name was entered or submitted as last name first, first name last, when a corresponding data entry form or interface requested entry of first name first, last name last. Other types of anomalies can include erroneous content. For example, a particular data entry for a numerical amount includes a comma where a period is needed (15,000,00 instead of 15,000.00). In another example, character and word entry errors can be caused by misrecognition from optical character recognition (OCR) systems (e.g. "Barros" recognized as "Bamos," "Orange" recognized as "Orangc"). There also exist data entry errors due to typing (e.g. "Banos" typed as "Bartos"). Even auto correction processes can cause errors by forcing a correction where no correction is needed. Another type of anomaly includes non-compliance to business rules. For example, a particular interest rate of a given loan should not be greater than 20%, but data extracted from a document related to this given loan records the particular interest rate as 35%. In another example, extracted data from a given real property document includes a name of a single individual captured from an owner name field, when in reality there are multiple co-owners associated with this given real property document. Yet other anomalies can include inconsistency between data elements. For example, a recording date of a deed for real property is earlier than a document preparation date, or entity names derived from associated numbers do not correspond to an extracted entity name.

There are several processes for verifying that data is correct. Manual processes can be used where one or more individuals review data to validate and correct. Manual processes have been successful to handle certain types of anomalies, but manual processes carry an inherent limitation of scalability and speed. A manual validation process is typically slow and expensive. There are other manual validation processes that are assisted by technology to increase speed. Still, there are several limitations in technological capabilities that result in substantial manual involvement to ensure data accuracy. It is desirable to have a data validation process that is accurate, scalable, fast, and economical.

Techniques disclosed herein provide a fully-automated process for data validation and correction. Such an automated system helps reduce costs, improve productivity, improve scalability, improve data quality, improve accuracy, and enhance data security. Such techniques include a data manager for automated data validation and correction. The data manager identifies one or more anomalies from a given data set using both contextual information and validation rules, and then automatically corrects any identified anomalies or missing information. Thus, the data manager can help to validate data, which might include data suspected of having errors, and then to clean-up or fix the erroneous or incomplete values. The data manager provides a technology solution that can eliminate the need for manual validation.

In one embodiment, a data manager creates a list of data elements. The list of data elements includes data elements that are similar to a given data element from a set of extracted data elements. Data elements can be extracted from documents, audio, spoken responses, keyboard entries, and so forth. The data manager searches at least one data source to retrieve search results associated with the list of data elements. The data manager correlates the search results with the list of data elements to generate a weighted list of data elements. This weighted list of data elements includes an assigned weight for pairs or sets of data elements. Each assigned weight indicates a probability of a correct pairing based on information associated with the set of extracted data elements. The data manager modifies assigned weights in the weighted list of data elements based on validation rules. Finally, the data manager validates the given data element based on modified assigned weights. Such validation can be executed via at least one computer processor.

In other embodiments, the data manager generates similar data elements that are variations of the given data element, such as different spellings of a given word. Such different spellings can be based on identified patterns of errors from OCR systems and/or manual keyboard input. The data manager can also simultaneously generate multiple lists of similar data elements corresponding to different data elements from the set of extracted data elements. The data manager then searches and correlates multiple lists of data elements, and can combine and correlate weights among multiple search results.

Yet other embodiments herein include software programs to perform the steps and operations summarized above and discussed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: creating a list of data elements, the list of data elements including data elements that are similar to a given data element from a set of extracted data elements; searching at least one data source to retrieve search results associated with the list of data elements; correlating the search results with the list of data elements to generate a weighted list of data elements, the weighted list of data elements including an assigned weight for pairs of data elements, each assigned weight indicating a probability of a correct pairing based on information associated with the set of extracted data elements; modifying assigned weights in the weighted list of data elements based on validation rules; and via execution of at least one computer processor, validating the given data element based on modified assigned weights. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by CoreLogic, Inc., Santa Ana, Calif. 92707.

As discussed above, techniques herein are well suited for use in software applications supporting data validation applications. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

FIG. 3 is a table having sample values of a name search for help illustrating data validation operations according to embodiments herein.

FIG. 5 is a table having sample values of an address search for help illustrating data validation operations according to embodiments herein.

FIG. 7 is a table having sample values of a property information search for help illustrating data validation operations according to embodiments herein.

FIG. 9 is a table having sample values of name and address correlation for help illustrating data validation operations according to embodiments herein.

FIGS. 10-11 are tables having sample values of data element correlation for help illustrating data validation operations according to embodiments herein.

FIG. 13 is a table having sample values of data element correlation for help illustrating data validation operations according to embodiments herein.

DETAILED DESCRIPTION

Techniques disclosed herein include systems and methods for data validation and correction. Such systems and methods can reduce costs, improve productivity, improve scalability, improve data quality, improve accuracy, and enhance data security. Such techniques include a data manager for automated data validation and correction. The data manager identifies one or more anomalies from a given data set using both contextual information and validation rules, and then automatically corrects any identified anomalies or missing information.

In general, the data validation process can involve several steps. One step is automatic identification of one or more anomalies such as incorrect formatting, erroneous content, non-compliance to business rules, inconsistency between data elements, and so forth. Another step is selection of one or more steps for correction of the anomalies. For example, correction steps can involve database queries, mathematical formulation, checksum validations, business rules compliance, and data formatting information. Another step is application of one or more correction methodologies. Such correction methodologies can include name parsing and standardization, address standardization, database queries, or other information retrieval and comparison. A step of completing a data correction process can involve calculating missing values, correcting format, adjusting for inference from other data elements/sources, and correcting erroneous data generally. Another step is correlating different data elements and assigning weights based on their contextual information and based on business rules. The data validation process can then continue to a step to select a most appropriate and corrected data element package from a weighted list. The data validation process can also flag for apparent indecision of the automated process, failing to meet a predetermined threshold for accuracy, and can also highlight residual cases for further analysis including manual review.

Specific example embodiments of data validation processes can be explained by reference to diagrams and tables from the figures. Note that the example diagrams, flow charts, and tables describe data validation processes as applied to a real property domain, such as used with real-estate mortgage information. The domain of real-property, and data validation of real property information, includes challenges and nuances that are not applicable to or common among other domains. Techniques herein, however, can be applied to other domains or fields such as insurance, medicine, education, government, etc. Each domain can include separate nuances and challenges that are not obvious from one domain to another, requiring different techniques and processes for accurate data validation of data or documents within a respective domain.

Figure 1:
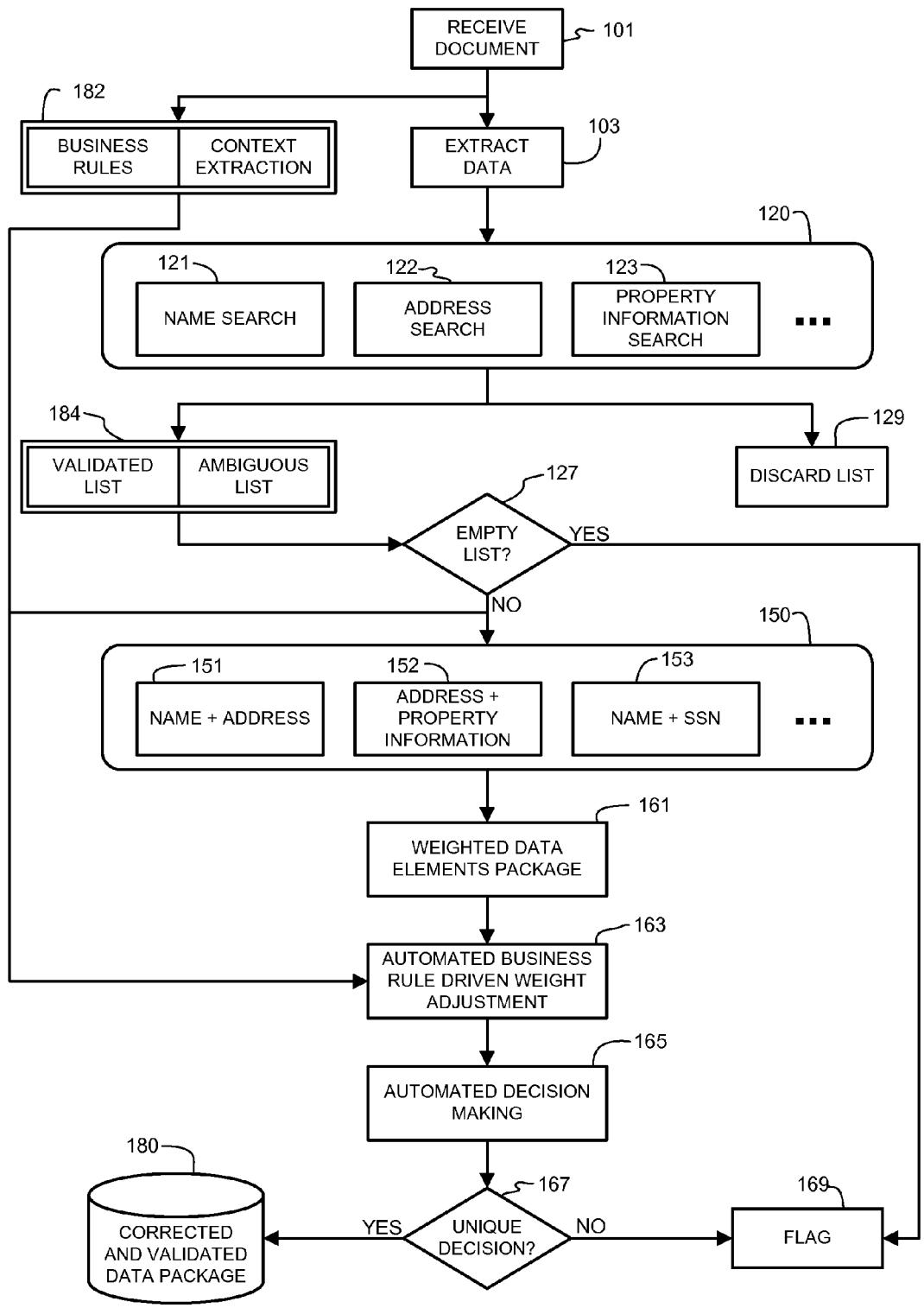
FIG. 1 is a diagram illustrating an example of a process supporting data validation operations according to embodiments herein.

Referring to FIG. 1, in step 101, the data manager receives a document, or otherwise accesses data from one or more data sources. Existing data associated with the document can be input in various ways. For example a mortgage document might be originally completed on paper, and then the system uses a type of optical character recognition to import printed or handwritten characters. In another example, data associated with the document or with the domain might be entered and received electronically such as by using a telephone or keyboard to input information on a web form. Regardless of the manner of data input, errors or mistakes can happen.

In step 103, the data manager extracts data from a document, database or other data source. Data extraction can be automatic, manual, or a combination of manual and automatic extraction techniques. In step 182 the data manager extracts contextual information and/or business rules. Such extraction of contextual information can happen at about the time of data extraction, or before or after. The system can also use periodic context extraction events depending on subsequent data validation processes. The data manager can build an index or database to organize identified contextual information. For example, the context information can relate to a type or format of data within the document, a domain associated with the document, dependent or logical relationships among data elements, and so forth. By way of a non-limiting example, a sample document can be associated with the domain, or field, of real estate. In this example domain, the received document can be a mortgage document, and data within the document might include buyer information, seller information, property information, financial information, etc.

The context extraction and the data extraction can also include identifying business rules associated with the document. For example, with respect to this real estate domain example, one business rule might include instructions that data that is identified as an interest-rate must fall within a certain range of interest rates. More specifically, this business rule could specify that a data element identified as an interest-rate must fall within the range of 2-20% to be valid.

After data extraction, the data manager refines or further processes data elements among extracted data. In step 120, data manager identifies and refines specific types of data elements for generating similar data elements. For example, one type of data element that involves generating similar data elements is the data element of names, as in names of people, business, and other entities. Data elements in this example include name, address, and property information. This can include any characters, numbers, words, or group of information as a unit, identified to be validated. Step 120 can include one or more searches such as name search 121, address search 122, and property information search 123. Such searches can help to sort similar data elements that have been either generated or retrieved. Search results can result in the data manager compiling a list 184 of validated and/or ambiguous data elements. The data manager can also create a discard list 129 of data elements that are not candidates for subsequent analysis and validation. In step 127, the data manager determines if one or more lists are empty or without data. If a list is empty, then the list can be flagged in step 169, otherwise data manager continues processing data elements. Step 120 will be discussed in more detail in subsequent figures.

Step 150 involves algorithmic anomalous data elements identification and refinement to correlate various data elements in various combinations. In step 150, data manager pairs or groups data elements. Step 150 shows several example data elements used for joint analysis. Example pairings for correlation include name and address 151, address and property information 152, and name and social security number 153. Note again that these are simply example pairings, and there can be any number of combinations available for anomalous data identification. The data manager uses search results and extracted contextual information from pairs or groups of data elements to correlate pairings to produce a weighted data package 161 that identifies anomalies among the extracted data. Processes associated with step 150 will be discussed in more detail in subsequent figures.

In step 163, the data manager further modifies the weighted data element package from step 161 by automatically adjusting assigned weights based on one or more business rules. Within any given domain there can be a set of rules that dictate how data should appear within a document. More generally, there are conventions or rules or patterns that can be associated with, or observed from, a given data element within a document. By way of a specific example, mortgage documents typically include or involve a specific interest-rate. Typically, such an interest rate falls within an observed range such as 2% to 20%, and might also be limited by usury laws so as not to exceed a predetermined rate. The data manager can then create business rules from such observations or external knowledge as part of the process of automatically identifying anomalies. By way of a non-limiting specific example, a given optical character recognition engine might recognize a printed interest rate of "3.6%" as "36%" by failing to recognize the decimal point. While "36%" would be an adequate number to pass a format test that determines whether this value is in a proper interest rate form, subsequent analysis of this interest rate value using a business rule would determine that the value exceeds an acceptable or expected rate, and is therefore anomalous. Accordingly, the data manager can then adjust the weight of this data element because the interest rate exceeds an acceptable value range or limit. Alternatively, the data manager can identify related values within the document such as a mortgage principal and monthly payments to compute an expected interest rate for verifying and correcting the possibly anomalous interest-rate. In another specific example, a contextual analysis determines that there are multiple owners of a single property. Such knowledge can be used to identify associated data elements that list only a single owner when multiple owners should be included. For any given domain or type of document, the data manager can use general business rules, specific business rules, logical rules based on contextual observations, and other validation rules. Thus, step 163 can result in weight readjustments based on applying one or more business rules or other context-based rules or filters.

In step 165, the data manager executes automated decision making based on correlated data elements and assigned and adjusted weights. In step 167, the data manager can determine whether there is a unique best decision, such as a data element (or data element pair/group) having a calculated weight greater than the calculated weights of remaining data elements. If there exists one weight that is greater than all other weights, then the corresponding data element can be used for validating and/or correcting data from the received document. In response to identifying a unique best weight, the data manager, in step 180, can automatically correct and validate the associated data element including updating the received document or source from which the data element was extracted. Data validation can include all of the sub steps of indicating that data is valid, correcting incorrect data, and completing missing values. Note that having a unique highest weight does not need to be determinative. For example, if a next highest weight is relatively close (such as within a few percentage points) then the data manager may flag those data elements as too close for automatic correction and validation in step 169.

Figure 2:
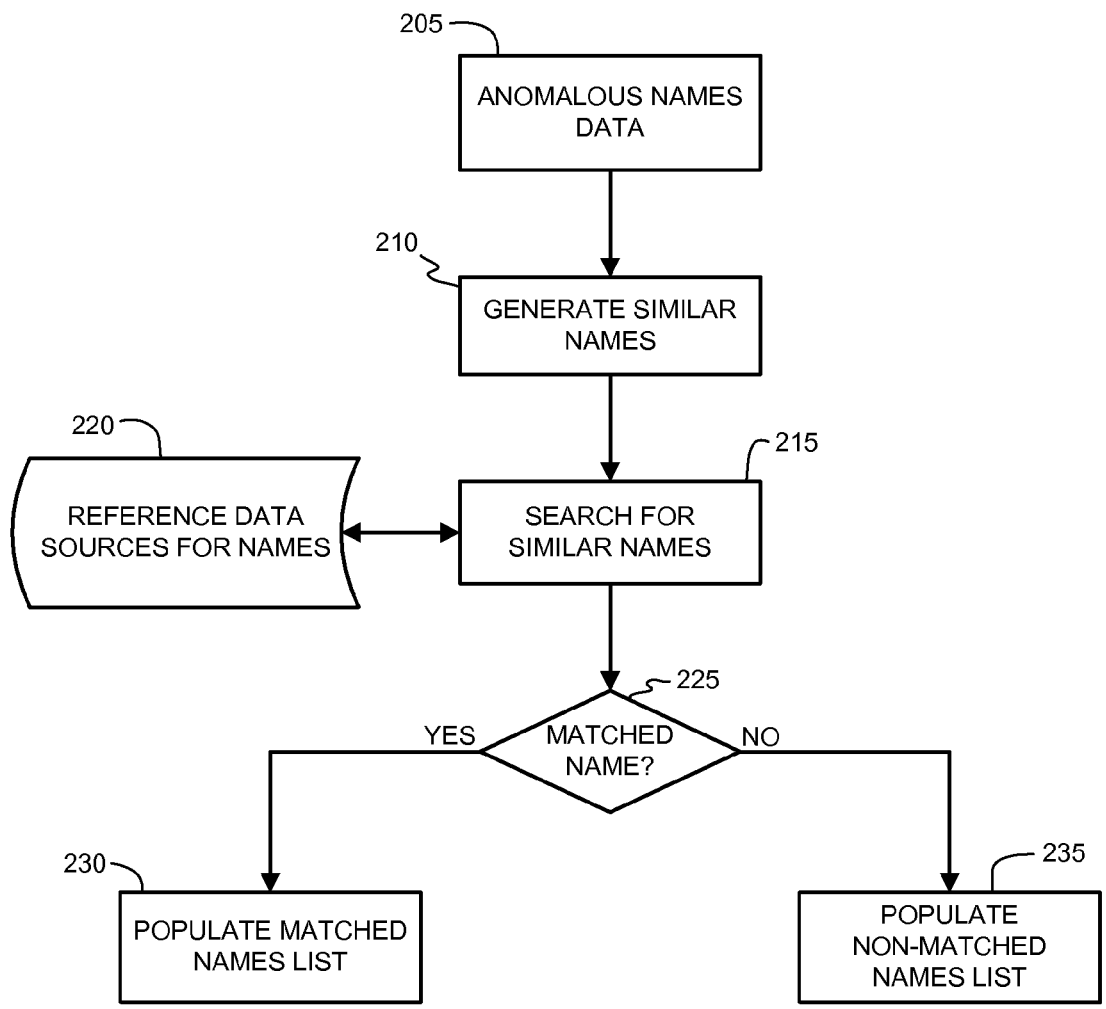
FIG. 2 is a diagram illustrating an example of a process supporting data validation operations according to embodiments herein.

FIG. 2 is a diagram illustrating an example of a process supporting data validation operations. Specifically, FIG. 2 relates to a process for generating a list of similar data elements, as part of step 120 of FIG. 1. In step 205, data manager receives or accesses anomalous names data, such as from a data store or document. At this point the anomalous name data can simply be data that has not yet been validated. In step 210, the data manager generates similar names for specific data elements. FIG. 3 shows table 300 having example values relating to the process of identifying and refining names. Column 305 shows a couple of example names "Cesar Octavio" and "John Nelson" that have been extracted from a document or other set of data. Column 306 lists several names that have been generated and that are similar to the example names. Note that within the list of similar names generated by the data manager, there are several names that differ from the extracted names by one or more letters. Such a list of generated names can represent minor spelling variations, pronunciation variations, and optical character recognition variations, and so forth. Note that the list of similar names generated in column 306 is not an exhaustive list, but is instead a representation of a few similar names that can be generated for the example input names based on various different patterns of errors.

The data manager can use various sub processes for generating names. For example, the data manager can consult one or more databases that return multiple spelling variations for a given name. As a specific example, the name "John" is also commonly spelled as "Jon." Thus, the name "Jon Nelson" could have been erroneously input as the name "John Nelson," especially if a telephone representative was keying in data based on spoken input. In addition to a service representative entering an alternative spelling after hearing a correct pronunciation of the name, a given service representative might incorrectly hear a name or one or more letters in the name. For example, a service representative, when hearing the name "Peeta," might hear the letter "P" as the letter "B" and then input erroneous data. Another common source of errors results from automated character recognition processes such as optical character recognition. The data manager can identify a pattern of errors associated with optical character recognition. For example, during an optical character recognition process, the letter "n" appearing on a scanned page might be recognized as the letter "r." Likewise, the lowercase letter "i" could be recognized as the lowercase letter "l," or the combination of letters "ln" might be recognized as the single letter "h." Another common source of errors can come from keyboard input operations when incorrect keys are pressed, such as when a user mistakenly shifts a finger position to an adjacent key when intending to depress a different key. For example, in conventional keyboards, the letter "n" is positioned next to the letter "m." Thus a person intending to input the letter "m" might mistakenly input the letter "n" without noticing the mistake.

The data manager can generate similar names based on any of these sources of errors, a combination of these sources of errors, or any other source of errors. For example, the data manager can maintain or access a database of historically common errors that can be accessed for similar name generation. Such a database of historical errors can be a product of quality checks that have identified repeated forms of errors. Note that while errors related to manual keyboard input can be relatively straightforward, errors related to optical character recognition can be specific to domain, type of document, and to optical character recognition systems themselves.

Next, in step 215, the data manager searches for the generated similar names by referencing one or more data sources (220) of names. That is, the data manager searches one or more data sources to determine if each of the generated similar names already exists. Example column 307 shows the results from the comparison of similar generated names with the one or more data sources by identifying whether each generated name—and the input name itself—is found or not found within the one or more data sources, such as a name directory. In step 225, the data manager identifies whether each name has been matched with an identical name in the data source, and then sorts each name into a corresponding labeled destination list, as shown in column 308. For names that have been matched or found, the data manager populates a matched names list 230. For names that have not been matched or found, the data manager populates a list of non-matched names 235.

With certain types of data elements it is difficult to be entirely certain that an extracted or generated data element is correct by a simple check to see if the data exists in a known database. For example, when a data element is an individual's name, any extracted name could be correct even if the individual's name does not exist in accessible databases.

Figure 4:
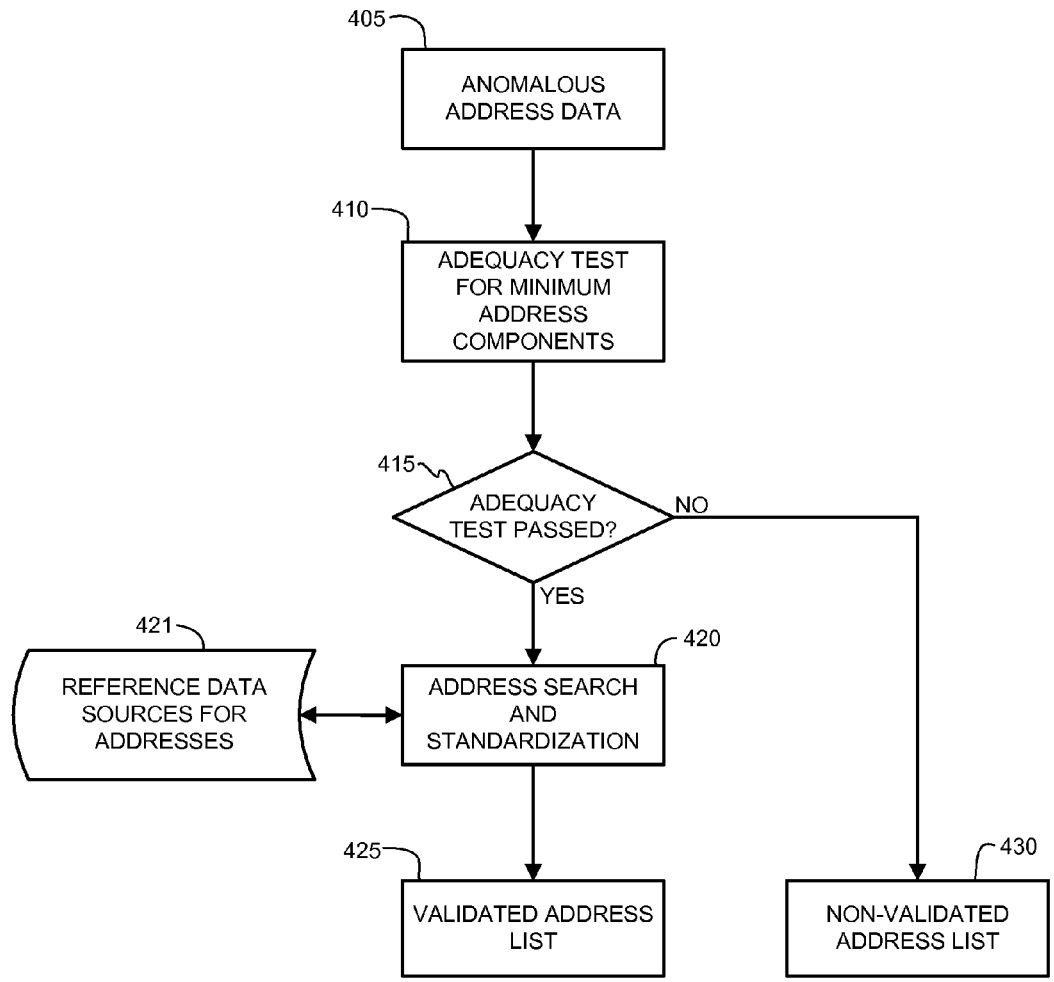
FIG. 4 is a diagram illustrating an example of a process supporting data validation operations according to embodiments herein.

FIG. 4 is a diagram illustrating an example of a process supporting data validation operations. Specifically, FIG. 4 is a flow chart that shows a process for identifying and refining potentially anomalous address information, as in real property addresses. In step 405, the data manager receives potentially anomalous address data. FIG. 5 shows table 500 having example values relating to the process of an address search. FIG. 5 is a table showing specific sample addresses that can be identified and refined. For example, column 505 shows a sample set of input addresses to be analyzed. Generally, there are inherent distinctions between different types of data elements. For example, data elements of names and addresses have different characteristics. With respect to names, there are many variations among names, and names can be changed and invented. Thus, in some ways it can be relatively more difficult to identify anomalies in names. With respect to addresses, however, there is a relatively finite list of addresses that can be regularly updated, such as when new buildings are completed. Additionally, addresses for a given geographical area typically have one or more address components required for correct identification of a corresponding location. Without a minimum number of address components, a given input address may not be recognizable as an address. Given an address' minimum components for a recognizable address, in step 410, the data manager analyzes each input address for minimum address components. In other words, the data manager performs an adequacy test to test for minimum address components.

In step 415, the data manager decides whether each input address passes the adequacy test. Column 510 shows example results of an adequacy test outcome. Note that in these example results, the input addresses that failed the adequacy test typically lacks a zip code or a street name or other component necessary for proper identification of an address. For input addresses that failed the adequacy test, the data manager passes these addresses to a non-validated address list 430, or otherwise flags these addresses.

The data manager continues processing addresses that passed the adequacy test. In step 420, the data manager searches for addresses within a database of addresses (421) to identify identical and/or similar existing addresses. Step 420 can also result in generating a standardized address format, especially when the reference data sources for addresses maintain a standardized list of addresses. In step 425, the data manager, based on the address search results, compiles a validated list of addresses. Column 515 shows example search outcomes and standardization of input addresses. Note that in column 515, such standardization can add state or zip code, or other address components as found in the reference data sources. The remaining columns 521-526 show the standardized addresses parsed into individual address components.

Figure 6:
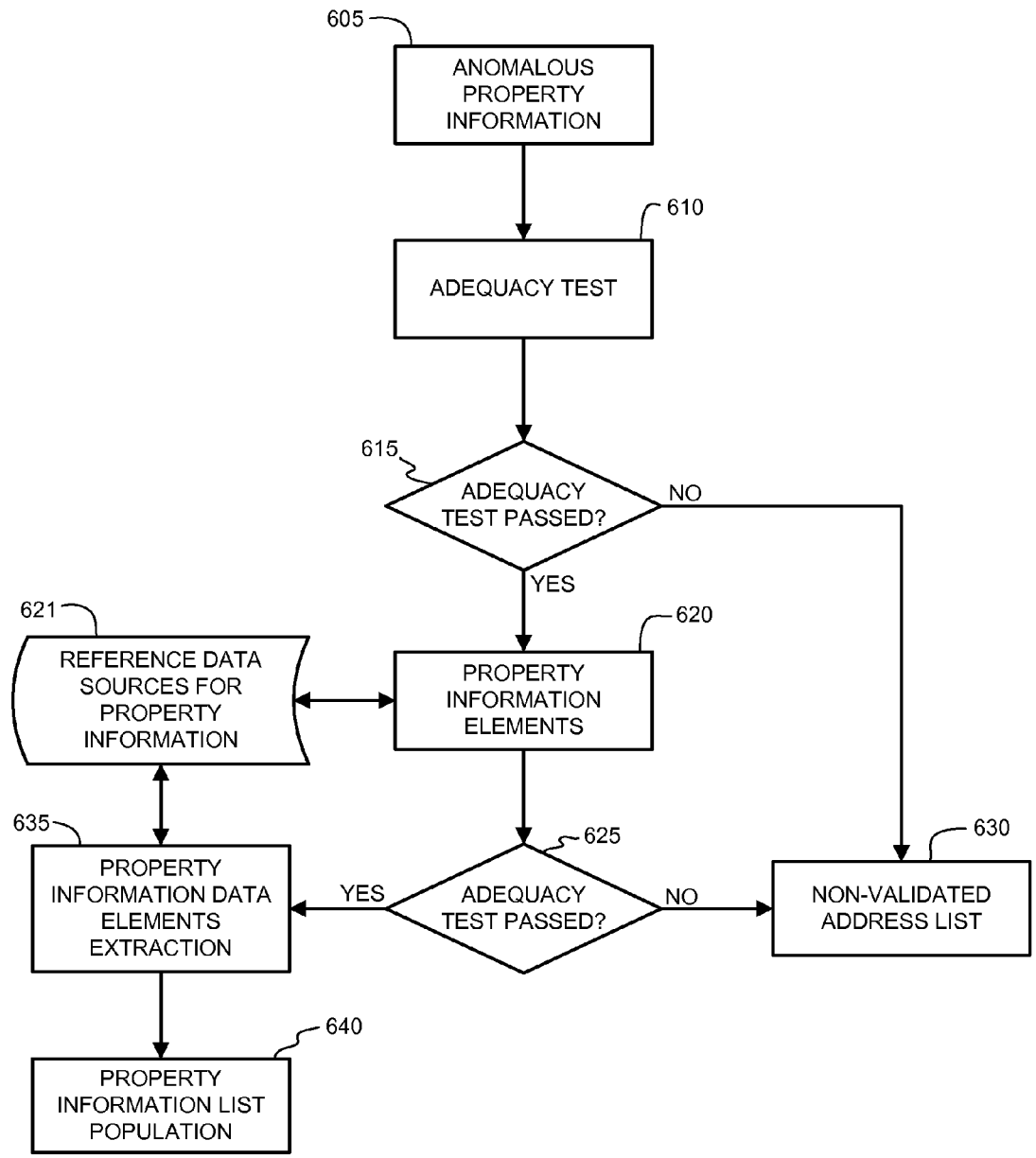
FIG. 6 is a diagram illustrating an example of a process supporting data validation operations according to embodiments herein.

FIG. 6 is a diagram illustrating an example of a process supporting data validation operations for identifying and refining anomalous property information. In step 605, the data manager receives potentially anomalous property information. FIG. 7 shows table 700 having example values relating to the process of a property information search. Property information received can be of various types, such as a legal description, a property title, a tax ID number such as an Assessor's Parcel Number (APN), and so forth. Column 705 shows samples of various types of property information. In step 610, the data manager performs an adequacy test by analyzing input property information to determine if there is sufficient information for executing a property information search. In step 615, if the data manager determines that a specific property information input fails the adequacy test, then the data manager sorts the failed input address data into a non-validated address list 630. For example, with respect to the non-limiting example of real estate, if given input data contains a lot number and a county name only, then the data manager will mark such input data as inadequate since identical lot numbers can appear multiple times in any given real estate database. Even county names are not always unique in that multiple states can share the same county name. Column 710 shows example results of an adequacy test outcome.

For property information that passes the adequacy test, the data manager continues in step 620 by searching reference data sources 621 for existing property information. Such a search may result in single or multiple results, as shown in column 715. In step 625, the data manager can execute an additional adequacy test on the search results. For search results that are inadequate, the data manager identifies these addresses as part of the non-validated address list 630. For search results that pass the adequacy test, data manager continues processing by extracting property information data, in step 635, and populating a list of property information in step 640. Columns 721 and 722 show sample data as a result of the data element extraction.

Figure 8:
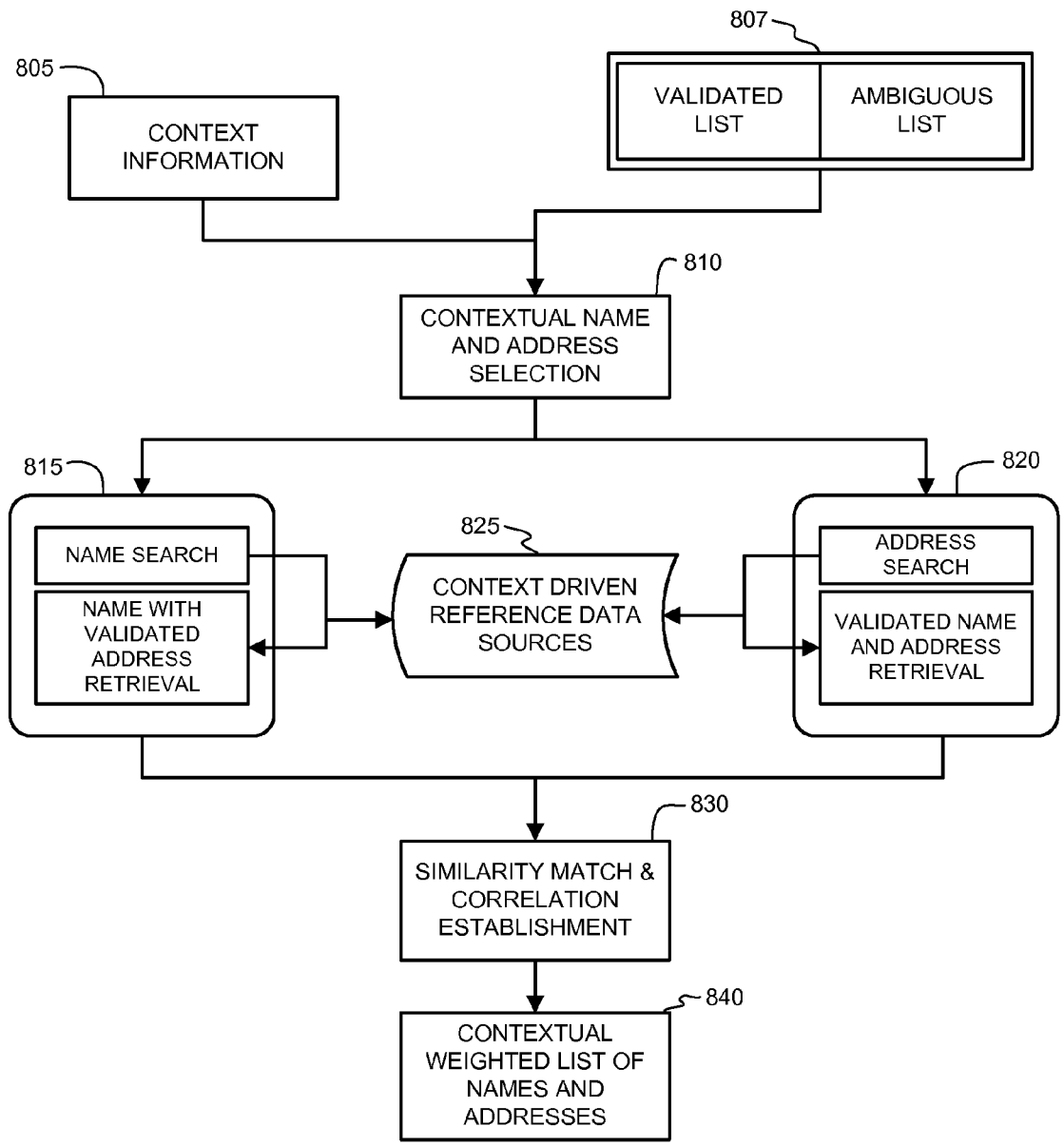
FIG. 8 is a diagram illustrating an example of a process supporting data validation operations according to embodiments herein.

FIG. 8 is a diagram illustrating an example of a process of automated multi-tiered correlation of data elements. FIG. 9 shows table 900 having sample data representing correlated data. In step 805, the data manager accesses context information related to extracted data or corresponding to a specific domain of the data elements. In step 807, the data manager accesses a list of validated and/or ambiguous data elements to be analyzed to identify any anomalies. In step 810, the data manager selects two or more different types or fields of data elements. In this example, the data elements of name and address are selected for comparison. For example, columns 905 and 910 show sample input names and data types. Column 915 shows supporting information or context information associated with the specific example input. In this specific example, the context information at least identifies that a subject name is associated with a specific state for row group 951.

In step 815, the data manager executes a name search from a context driven reference data source (825) to identify results that consists of a matching name and associated validated address. The data manager executes this name search for each input name. In this specific example with respect to real estate, because the context information is the state of Arizona, the data manager searches for matching address records for each given input name within a data source of names and addresses associated with Arizona. By using context-based data sources, the amount of results can be significantly reduced. For example, without using context-based data sources the data manager might search for records in all of the United States or beyond, which results could be unmanageable or at least an inefficient use of computing resources. Note that for each name input used in the name search, the data manager may identify multiple records that match, single records that match, or no records that match, as shown in column 921. The data manager then combines each search input with a result. FIG. 9 shows a search outcome of names 922 joined or paired with addresses 923 received from the results.

In addition to the name search, the data manager executes an address search in step 820 to identify any names associated with a given input address by searching one or more context driven reference data sources 825. Results of an example address search and validated name search are shown in row 952. In step 830, after completing the context-driven name search and address search, the data manager matches results data to identify similarities, and establish correlations among the results. Columns 912 and 913 show the search outcome of matched names and addresses. In step 840, the data manager identifies or creates a contextually weighted list of names and addresses by comparing name search results from step 815 with address search results from step 820. Column 940 shows values for example weight assignments on an arbitrary scale of zero to 100. Typically, greater assigned weight values correspond to a higher probability of a correct data element pairing or grouping, though any system of value assignments can be used.

The process of FIG. 8 can be repeated for various combinations of data elements. For example, instead of the inputs of name and address to correlate, the inputs can be any other data elements. Continuing with this real estate example, other data element parings can include assessors parcel number (APN) and address, or APN and name. FIG. 10 shows table 1000 representing results from a search and correlation between an APN input 1005 and an address input 1010. In this example, each input returned a single record 1021 yielding pairings of APN with address as shown in columns 1022 and 1023. With search outcomes now paired, the data manager can then correlate and assign weights as shown in column 1040.

The data manager also repeats the process of FIG. 8 to generate table 1100 of FIG. 11. Table 1100 uses inputs of APN (column 1105) and name (column 1110). Some of the returns 1121 include multiple records. The data manager then pairs resultant APNs in column 1122 with owner names in column 1123 for correlating pairs of data elements to generate an assigned weight, as shown in column 1140.

Figure 12:
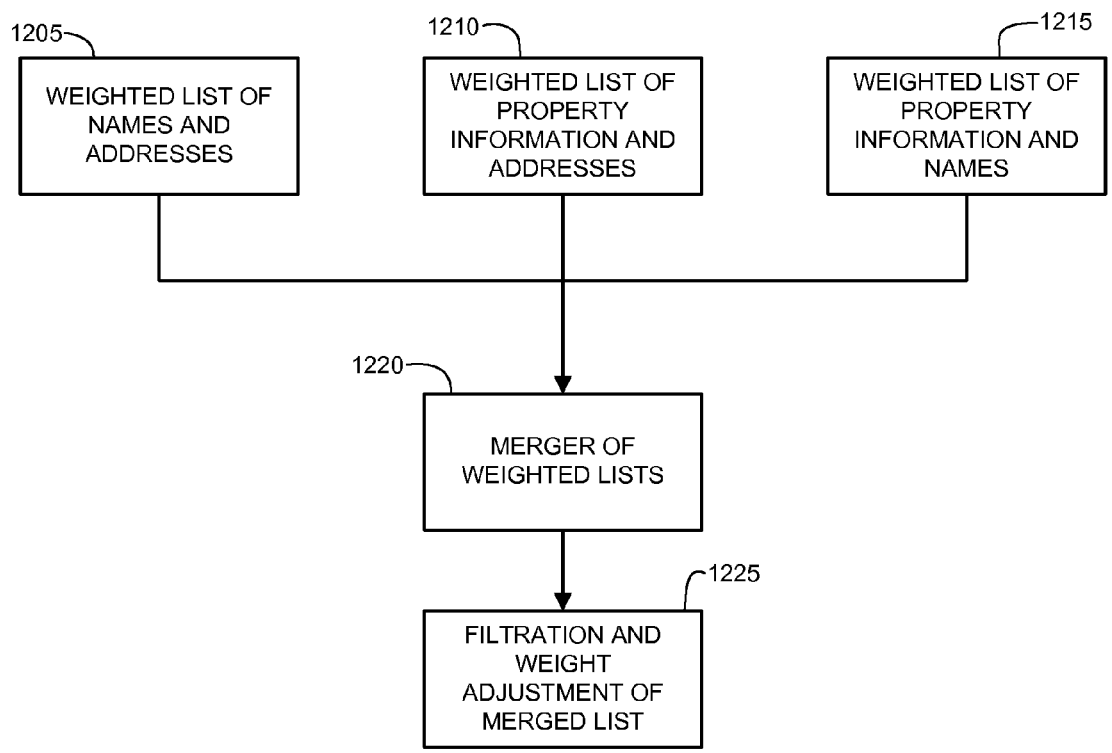
FIG. 12 is a diagram illustrating an example of a process supporting data validation operations according to embodiments herein.

FIG. 12 is a diagram illustrating an example process of weighting sets of data elements. This process corresponds to steps 161 and 163 from FIG. 1. FIG. 12 illustrates correlation among multiple pairings of searched data elements by continuing with the real estate example. The data manager accesses or receives multiple sets of correlated data elements including a weighted list of names and addresses (1205), a weighted list of property information and addresses (1210), and a weighted list of property information and names (1215). In step 1220, the data manager combines or merges these weighted lists and then filters and adjusts weights of the merged list (step 1225).

FIG. 13 shows table 1300 representing a merged lists of weighted lists, with some sample values for each list. Each of row groups 1351, 1352, and 1353 corresponds to a separate weighted list. Columns 1305, 1310, and 1315 identify or label types of data inputs. Columns 1341, 1342, and 1343 show weighting for each list prior to merging. Columns 1321, 1322, and 1323 show standardized search results. With the lists merged, the data manager cross-correlates to produce adjusted weight as shown in column 1347.

The adjusted weight in column 1347 can also be a result of application of one or more data validation or business rules. The data manager analyzes multiple pairs or groups of data elements. Upon merging these lists, the data manager filters data elements and adjust weights of individual data elements on the merged list. Such filtering and weight adjustments can be based on application of any specific business rules in addition to any additional context information extracted from the document. For example, if a given data pairing has search results of only a single owner, then application of a contextual rule filter that shows there should be multiple owners would reduce an initial weighting of the pairing.

Functionality associated with the data manager will now be discussed via flowcharts and diagrams in FIG. 14 through FIG. 16. For purposes of the following discussion, the data manager or other appropriate entity performs steps in the flowcharts.

Figure 14:
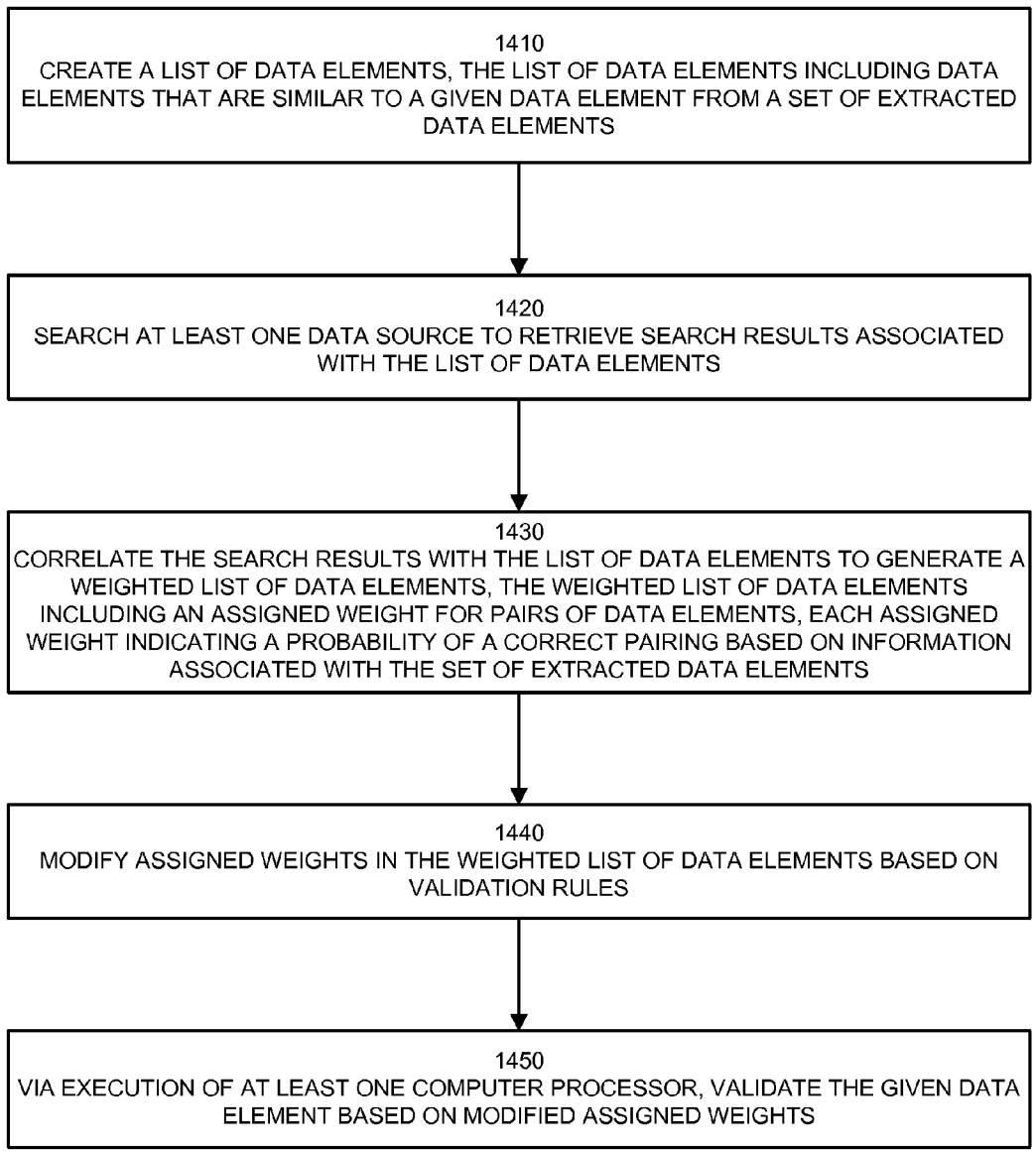
FIGS. 14-16 are flowcharts illustrating examples of processes supporting data validation operations according to embodiments herein.

Now describing embodiments more specifically, FIG. 14 is a flow chart illustrating data validation embodiments disclosed herein. In step 1410, the data manager creates a list of data elements. Data elements can be any unit or group of data or information, such as names, numbers, values, sentences, etc. The list of data elements includes data elements that are similar to a given data element from a set of extracted data elements. Data elements in this list of data elements can be created by name/character variation processes, or by searching a database to retrieve similar results. For example, such a list could include spelling variations of a given word, or standardized results retrieved from a database. Standardized results are similar to a given data element in that the results may vary in character case, spelling, punctuation, or data components. The set of extract data elements can include information captured from a document, form, database, conversation, etc.

In step 1420 the data manager searches at least one data source to retrieve search results associated with the list of data elements. Thus, the data manager can execute separate searches for each data element in the list of similar data elements, including a search of the given data element from the set of extracted data elements. The search results can indicate existence of each data element, and/or results corresponding to the data elements, such as existence of a name, or an address associated with a name.

In step 1430, the data manager correlates the search results with the list of data elements to generate a weighted list of data elements. This weighted list of data elements includes an assigned weight for pairs of data elements. Each assigned weight indicates a probability of a correct pairing based on information associated with the set of extracted data elements. This means that the weight is not restricted to being an indication of whether the search itself was correct, but whether the pairing is correct relative to the extracted data, or how correct is the pairing in light of the extracted data. For example, a given generated name (similar data element) might happen to be the name of a real person having a real address. While search results might retrieve information that is accurate by itself, the data manager assigns weights based on information associated with the set of extracted data elements. Thus, if the extracted data elements were captured from a document, then information associated with or within this document is used for assigning weights. More specifically, if in this example pairing, the generated name is absent from an associated document, but an address paired with this generated name is found in the document, then an assigned weight might have a value indicating that this particular example pairing is partially correct. In other words, the assigned weight value is based on the context of the set of extracted data elements, instead of accuracy of a search results by themselves.

In step 1440, the data manager modifies assigned weights in the weighted list of data elements based on validation rules. After context-based weight assignments have been made, the data manager can then use rules or filters to modify initial weight assignments. These validation rules can be context-based and/or general rules relating to data validation. For example, the data manager can identify logical dependencies among data elements within a document, and then create rules to check that those dependencies are satisfied as a basis for weight modification. Alternatively, rules can be based on general business principles, common errors, or government regulations.

In step 1450, via execution of at least one computer processor, the data manager validates the given data element based on modified assigned weights. Thus, the data manager can automatically validate data elements and/or an associated document without manual intervention.

Figure 15:
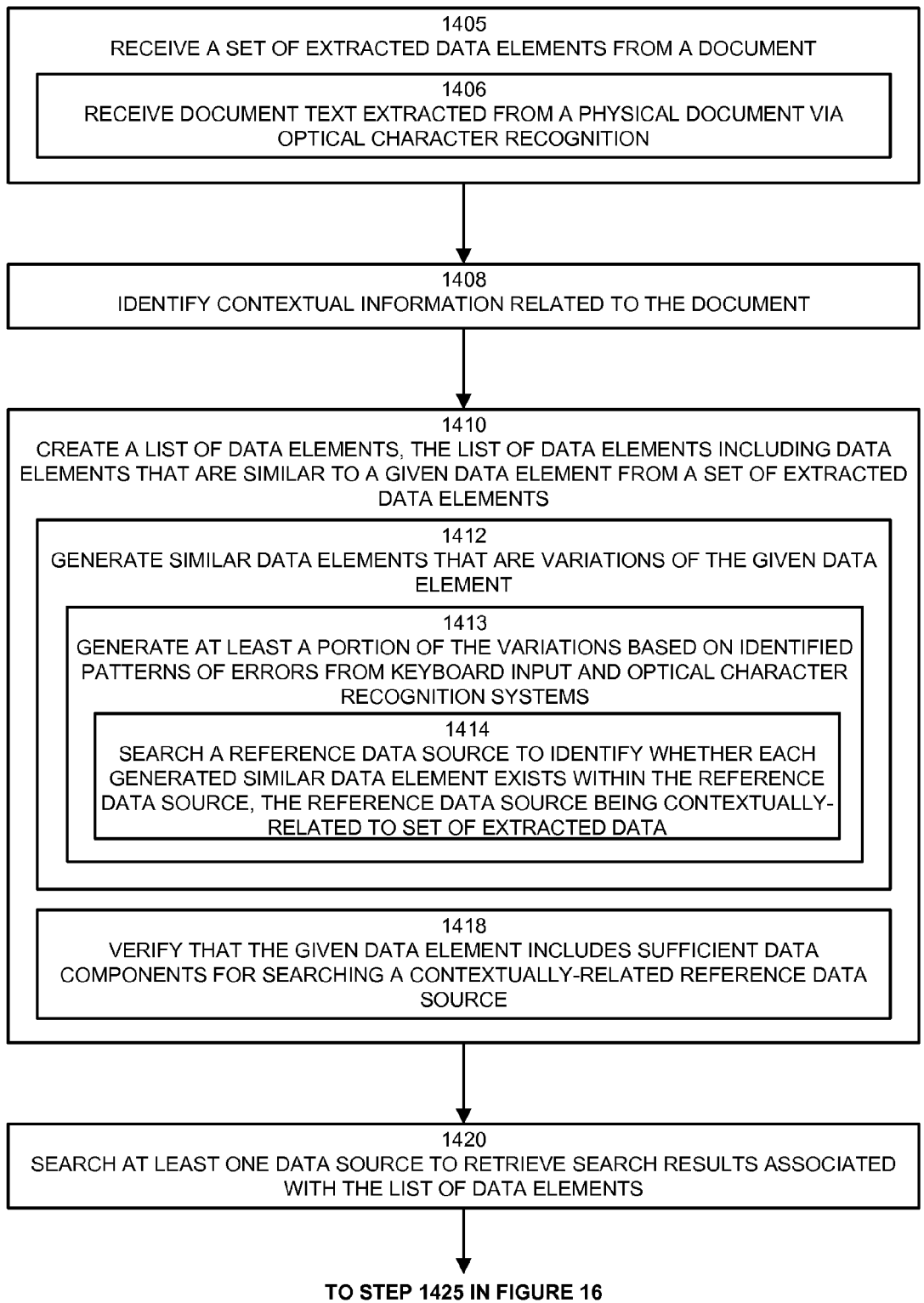
Figure 16:
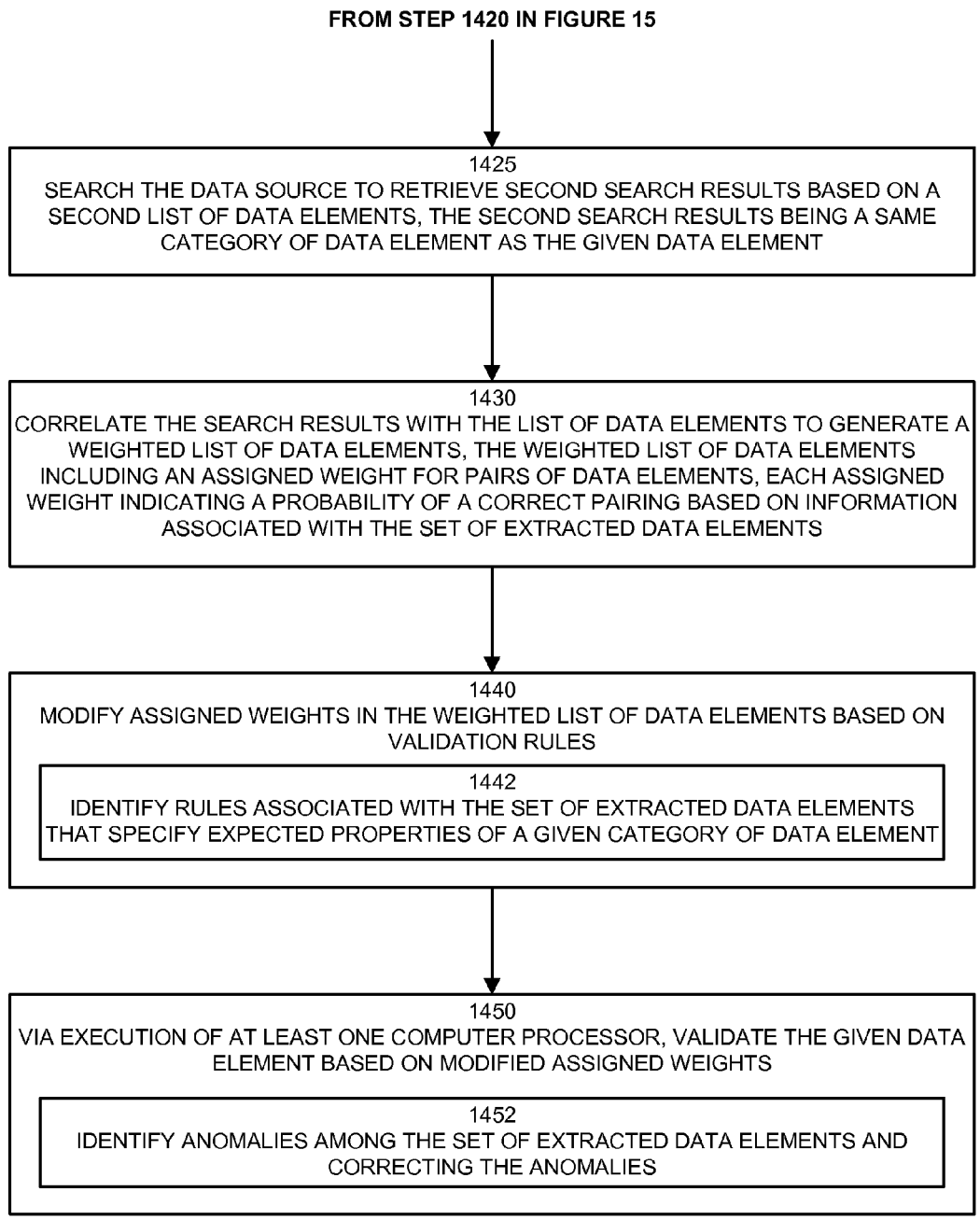

FIG. 15 and FIG. 16 show a flow chart of alternative or additional embodiments that can build on previous embodiments.

In step 1405, the data manager receives a set of extracted data elements from a document. For example, an online form document stores user inputs in a data store, or a physical document is analyzed by an optical character recognition system to identify form fields and input data elements. Form field names themselves can be extracted as part of contextual information for use in assigning weights and/or creating validation rules.

In step 1406, the data manager receives document text extracted from a physical document via optical character recognition. As noted above, the extracted text can include both entered data and data field labels.

In step 1408, the data manager identifies contextual information related to the document. The data elements themselves can be a basis for contextual information, as well as additional information on the document. The data manager can also consult external sources to identify metadata associated with the specific document or type of document.

In step 1410, the data manager creates a list of data elements. The list of data elements includes data elements that are similar to a given data element from a set of extracted data elements.

In step 1412, the data manager generates similar data elements that are variations of the given data element. Variations of data elements can include different spellings or different arrangements of characters including numbers.

In step 1413, the data manager generates at least a portion of the variations based on identified patterns of errors from keyboard input and optical character recognition systems. For example, manual keyboard input errors can be studied and organized to recognize specific types of errors and patterns of errors, which can then be used for replacing/deleting/adding/rearranging characters to generate similar data elements. Likewise, patterns of optical character recognition errors can be identified to create logic for modifying data elements based on patterns of errors.

In step 1414, the data manager searches a reference data source to identify whether each generated similar data element exists within the reference data source. This reference data source is contextually-related to set of extracted data elements. For example, if the given data element were an individual's name, then the data manager would generate similar names and search a directory of names with a search focus based on the set of extracted data. As a more specific example, if the context information indicated that the individual was older than a certain age and living in a certain state, then the data manager could accordingly restrict the search to retrieve focused search results.

In step 1418, the data manager verifies that the given data element includes sufficient data components for searching a contextually-related reference data source. This is an adequacy check. If the given search were for an address, then an input address would require enough of the address to retrieve results. If a given address had a street name only, then this might be insufficient information or might return too many results for efficient processing.

In step 1420, the data manager searches at least one data source to retrieve search results associated with the list of data elements.

In step 1425, the data manager searches the data source to retrieve second search results based on a second list of data elements. The second search results are a same category of data element as the given data element. Thus, if the first data element were a business name, then search might be to retrieve a tax ID number associated with business names as opposed to any search results associated with the business name. This step can be applied to any number of data elements and types of results associated with the extracted data.

In step 1430, the data manager correlates the search results with the list of data elements to generate a weighted list of data elements. This weighted list of data elements includes an assigned weight for pairs of data elements. Each assigned weight indicates a probability of a correct pairing based on information associated with the set of extracted data elements, In step 1440, the data manager modifies assigned weights in the weighted list of data elements based on validation rules.

In step 1442, the data manager identifies rules associated with the set of extracted data elements that specify expected properties of a given category of data element. For example, a given data element might be expected to include multiple names, a monetary amount within a certain range, a specific classification of billing code, a physician associated with a specific insurance network, signatory authority above a specified level of management, etc.

In step 1450, the data manager, via execution of at least one computer processor, validates the given data element based on modified assigned weights.

In step 1452, the data manager identifies anomalies among the set of extracted data elements and corrects the anomalies. Thus, the step of validation can include processes that correct, delete, add, or otherwise modify data elements.

Figure 17:
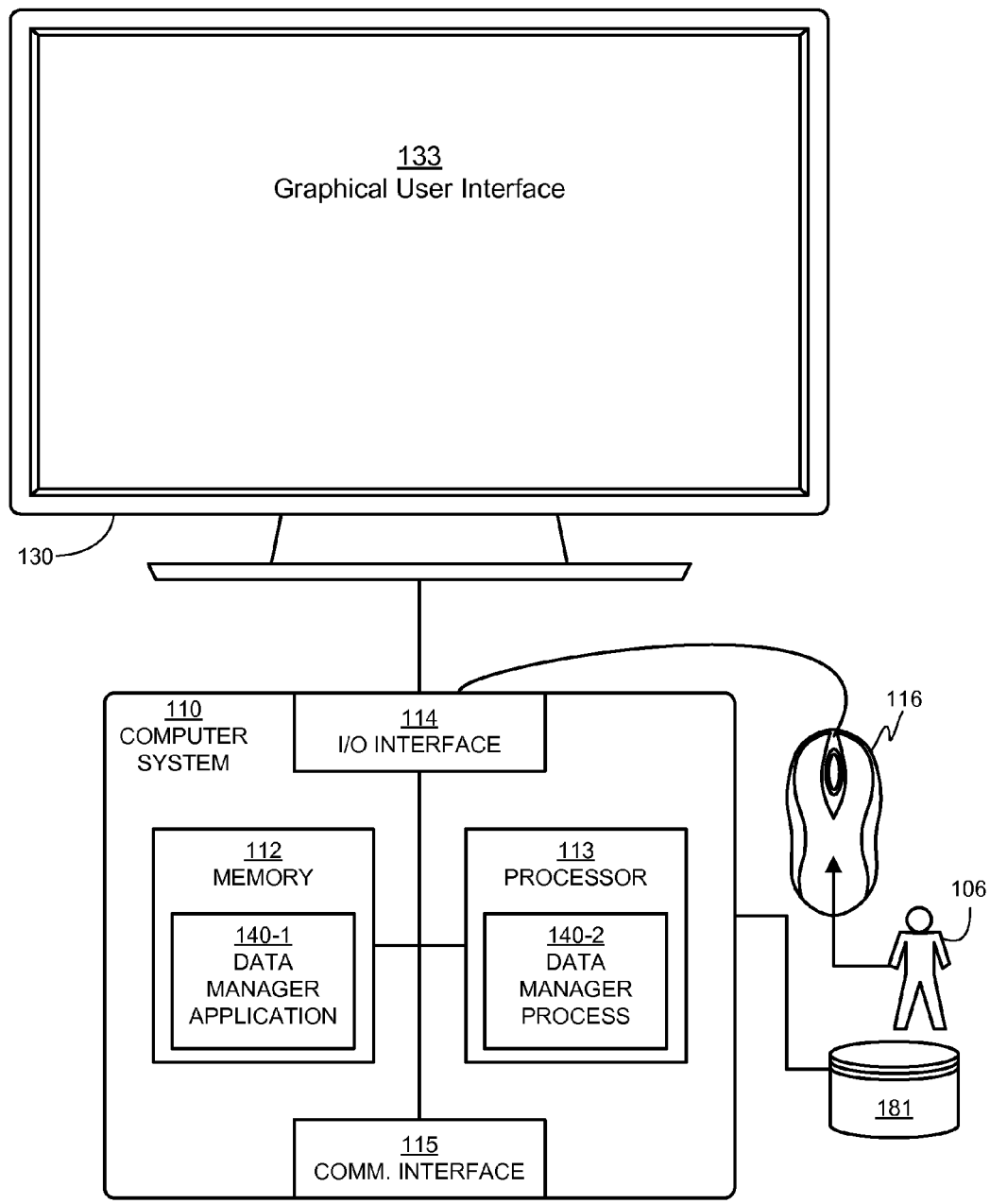
FIG. 17 is an example block diagram of a data manager operating in a computer/network environment according to embodiments herein.

Now referring to FIG. 17, the following discussion provides a basic embodiment indicating how to carry out functionality associated with the data manager 140 as discussed above. It should be noted, however, that the actual configuration for carrying out the data manager 140 can vary depending on a respective application. For example, computer system 110 can include one or multiple computers that carry out the processing as described herein.

In different embodiments, computer system 110 may be any of various types of devices, including, but not limited to, a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, or in general any type of computing or electronic device.

Computer system 110 is shown connected to display monitor 130 for displaying a graphical user interface 133 for a user 106 to operate using input devices 116. Repository 181 can optionally be used for storing data files and content both before and after processing. Input devices 116 can include one or more devices such as a keyboard, computer mouse, etc.

As shown, computer system 110 of the present example includes an interconnect 111 that couples a memory system 112, a processor 113, I/O interface 114, and a communications interface 115.

I/O interface 114 provides connectivity to peripheral devices such as input devices 116 including a computer mouse, a keyboard, a selection tool to move a cursor, display screen, etc.

Communications interface 115 enables the data manager 140 of computer system 110 to communicate over a network and, if necessary, retrieve any data required to create views, process content, communicate with a user, etc. according to embodiments herein.

As shown, memory system 112 is encoded with data manager 140-1 that supports functionality as discussed above and as discussed further below. Data manager 140-1 (and/or other resources as described herein) can be embodied as software code such as data and/or logic instructions that support processing functionality according to different embodiments described herein.

During operation of one embodiment, processor 113 accesses memory system 112 via the use of interconnect 111 in order to launch, run, execute, interpret or otherwise perform the logic instructions of the data manager 140-1. Execution of the data manager 140-1 produces processing functionality in data manager process 140-2. In other words, the data manager process 140-2 represents one or more portions of the data manager 140 performing within or upon the processor 113 in the computer system 110.

It should be noted that, in addition to the data manager process 140-2 that carries out method operations as discussed herein, other embodiments herein include the data manager 140-1 itself (i.e., the un-executed or non-performing logic instructions and/or data). The data manager 140-1 may be stored on a non-transitory, tangible computer-readable storage medium including computer readable storage media such as floppy disk, hard disk, optical medium, etc. According to other embodiments, the data manager 140-1 can also be stored in a memory type system such as in firmware, read only memory (ROM), or, as in this example, as executable code within the memory system 1012.

In addition to these embodiments, it should also be noted that other embodiments herein include the execution of the data manager 140-1 in processor 113 as the data manager process 140-2. Thus, those skilled in the art will understand that the computer system 110 can include other processes and/or software and hardware components, such as an operating system that controls allocation and use of hardware resources, or multiple processors.

Those skilled in the art will also understand that there can be many variations made to the operations of the techniques explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A computer-implemented method of validating real property data, the computer-implemented method comprising:
    extracting data elements from fields of a document that includes real estate information, each data element comprising a unit of data;
    analyzing content of the document to create business rules that represent relationships among content of the document, data elements from fields of the document, and real estate information;
    identifying a first data element and a second data element from the extracted data elements;
    generating multiple data elements that are variations of the first data element;
    generating multiple data elements that are variations of the second data element;
    using the multiple data elements that are variations of the first data element to search at least one database to retrieve a first set of search results, the first set of search results being a same type of data element as the second data element, the at least one database including real estate information;
    using the multiple data elements that are variations of the second data element to search at least one database to retrieve a second set of search results, the second set of search results being a same type of data element as the first data element, the at least one database including real estate information;
    correlating the first set of search results to the second set of search results to identify a measure of similarity between pairs of generated data elements and retrieved search results;
    assigning weights to each pair of generated data element and retrieved search result based on the measure of similarity;
    modifying assigned weights based on analysis using the created business rules;
    wherein modifying assigned weights based on business rules includes identifying rules associated with the set of extracted data elements that specify expected properties of a given category of data element; and
    in response to identifying an absence of an anomaly with the first data element based on the modified assigned weights, validating the first data element; and
    in response to identifying an anomaly with the first data element based on the modified assigned weights, automatically correcting the first data element.

2. The computer-implemented method of claim 1, wherein generating multiple data elements that are variations of the first data element includes generating at least a portion of the multiple data elements based on identified patterns of errors.

3. The computer-implemented method of claim 2, wherein creating business rules that represent relationships includes creating rules that specify expected properties of a given type of data element.

4. The computer-implemented method of claim 3, wherein extracting data elements from fields of the document includes extracting data from a physical document via optical character recognition.

5. The computer-implemented method of claim 4, wherein the first data element is a type of data element that is a name of an individual, and wherein the second data element is a type of data element that is a property address.

6. A computer-implemented method of validating real property data, the computer-implemented method comprising:
    receiving a set of data elements from a document, the document including real property information, the set of data elements including at least a first data element and a second data element;
    analyzing the document to identify relationships among the set of data elements;
    creating a first list of data elements that includes the first data element and additional data elements that are similar to the first data element;
    creating a second list of data elements that includes the second data element and additional data elements that are similar to the second data element;
    searching at least one real estate database using data elements from the first list of data elements to retrieve search results that are a same category of data element as the second data element;
    correlating the search results with the first list of data elements and with the second list of data elements to generate a weighted list of data elements that indicates an assigned weight for matched pairs of data elements, the weight indicating a probability of a correct match;
    modifying assigned weights in the weighted list of data elements based on execution of validation rules, the validation rules comprising rules representing identified relationships among the set of data elements;

wherein modifying assigned weights based on validation rules includes identifying rules associated with the set of extracted data elements that specify expected properties of a given category of data element; and validating the first data element based on modified assigned weights.

7. The computer-implemented method of claim 6, further comprising:

based on the modified assigned weights, identifying an anomaly with the first data element; and in response to identifying the anomaly, automatically correcting the anomaly with the first data element.

8. The computer-implemented method of claim 7, further comprising:

searching at least one real estate database using data elements from the second list of data elements to retrieve search results that are a same category of data element as the first data element.

9. The computer-implemented method of claim 8, wherein creating the first list of data elements includes generating similar data elements that are variations of the first data element based on identified patterns of errors from data input and data collection processes.

10. The computer-implemented method of claim 9, wherein creating the first list of data elements comprises searching at least one reference data source of real estate information to identify whether each similar data element exists within the at least one reference data source of real estate information.

11. The computer-implemented method of claim 10, wherein creating the first list of data elements includes verifying that the first data element includes sufficient data components for searching the at least one reference data source of real estate information.

12. A computer-implemented method of validating real property data, the computer-implemented method comprising:

creating a list of generated data elements, the list of generated data elements comprising generated data elements that are similar to a specific data element received from a source of real property data, each data element comprising a unit of data;

searching at least one real property database using the generated data elements from the list of generated data elements to retrieve search results;

correlating search results with the list of generated data elements to create a weighted list of data elements, the weighted list of data elements including an assigned weight for pairs of data elements, each assigned weight indicating a probability of a correct pairing based on a comparison of pairs of data elements;

modifying assigned weights in the weighted list of data elements based on validation rules associated with real property data from the source of real property data;

wherein modifying assigned weights based on validation rules includes identifying rules associated with the set of extracted data elements that specify expected properties of a given category of data element; and via execution of at least one computer processor, validating the specific data element based on modified assigned weights.

13. The computer-implemented method of claim 12, wherein validating the specific data element includes identifying anomalies among the set of extracted data elements and correcting the anomalies.

14. The computer-implemented method of claim 13, wherein creating the list of data elements includes generating similar data elements that are variations of the given data element including variations based on identified patterns of errors from keyboard input and optical character recognition systems.

15. A computer-implemented method of data validation, the computer-implemented method comprising:

creating a list of data elements, the list of data elements including data elements that are similar to a given data element from a set of extracted data elements;

searching at least one data source to retrieve search results associated with the list of data elements;

correlating the search results with the list of data elements to generate a weighted list of data elements, the weighted list of data elements including an assigned weight for pairs of data elements, each assigned weight indicating a probability of a correct pairing based on information associated with the set of extracted data elements;

modifying assigned weights in the weighted list of data elements based on validation rules;

wherein modifying assigned weights based on validation rules includes identifying rules associated with the set of extracted data elements that specify expected properties of a given category of data element; and via execution of at least one computer processor, validating the given data element based on modified assigned weights.

16. The computer-implemented method of claim 15, wherein creating the list of data elements includes generating similar data elements that are variations of the given data element.

17. The computer-implemented method of claim 16, wherein generating similar data elements that are variations of the given data element includes generating at least a portion of the variations based on identified patterns of errors.

18. The computer-implemented method of claim 17, wherein creating the list of data elements further includes searching at least one reference data source to identify whether each generated similar data element exists within the reference data source, the at least one reference data source being contextually-related to set of extracted data.

19. The computer-implemented method of claim 15, wherein creating the list of data elements includes verifying that the given data element includes sufficient data components for searching a contextually-related reference data source.

20. The computer-implemented method of claim 15, further comprising: searching the data source to retrieve second search results based on a second list of data elements, the second search results being a same category of data element as the given data element.

21. The computer-implemented method of claim 15, wherein validating the given data element includes identifying anomalies among the set of extracted data elements and correcting the anomalies.

22. The computer-implemented method of claim 15, further comprising:

receiving the set of extracted data elements from a document; and identifying contextual information related to the document.

23. The computer-implemented method of claim 22, wherein receiving the set of extracted data elements from the document includes receiving document text extracted from a physical document via optical character recognition.

24. A computer system for data validation, the computer system comprising:

a processor; and a memory coupled to the processor, the memory storing instructions that when executed by the processor cause the system to perform the operations of:

creating a list of data elements, the list of data elements including data elements that are similar to a given data element from a set of extracted data elements;

searching at least one data source to retrieve search results associated with the list of data elements;

correlating the search results with the list of data elements to generate a weighted list of data elements, the weighted list of data elements including an assigned weight for pairs of data elements, each assigned weight indicating a probability of a correct pairing based on information associated with the set of extracted data elements;

modifying assigned weights in the weighted list of data elements based on validation rules;

wherein modifying assigned weights based on validation rules includes identifying rules associated with the set of extracted data elements that specify expected properties of a given category of data element; and via execution of at least one computer processor, validating the given data element based on modified assigned weights.

25. The computer system of claim 24, wherein creating the list of data elements includes generating similar data elements that are variations of the given data element.

26. The computer system of claim 25, wherein generating similar data elements that are variations of the given data element includes generating at least a portion of the variations based on identified patterns of errors.

27. The computer system of claim 26, wherein creating the list of data elements further includes searching at least one reference data source to identify whether each generated similar data element exists within the reference data source, the at least one reference data source being contextually-related to set of extracted data.

28. The computer system of claim 24, wherein creating the list of data elements includes verifying that the given data element includes sufficient data components for searching a contextually-related reference data source.

29. The computer system of claim 24, further comprising: searching the data source to retrieve second search results based on a second list of data elements, the second search results being a same category of data element as the given data element.

30. The computer system of claim 24, wherein validating the given data element includes identifying anomalies among the set of extracted data elements and correcting the anomalies.

31. The computer system of claim 24, further comprising:

receiving the set of extracted data elements from a document; and identifying contextual information related to the document.

32. A computer program product including a non-transitory computer-storage medium having instructions stored thereon for processing data information, such that the instructions, when carried out by a processing device, cause the processing device to perform the operations of:

creating a list of data elements, the list of data elements including data elements that are similar to a given data element from a set of extracted data elements;

searching at least one data source to retrieve search results associated with the list of data elements;

correlating the search results with the list of data elements to generate a weighted list of data elements, the weighted list of data elements including an assigned weight for pairs of data elements, each assigned weight indicating a probability of a correct pairing based on information associated with the set of extracted data elements;

modifying assigned weights in the weighted list of data elements based on validation rules;

wherein modifying assigned weights based on validation rules includes identifying rules associated with the set of extracted data elements that specify expected properties of a given category of data element; and via execution of at least one computer processor, validating the given data element based on modified assigned weights.

* * * * *